UNITED STATES PATENT OFFICE.

JOHN SPITTALL, OF WINNIPEG, MANITOBA, CANADA, ASSIGNOR OF ONE-HALF TO ALEX McMILLAN, OF WINNIPEG, CANADA.

COMPOSITION OF MATTER.

No. 832,755.  Specification of Letters Patent.  Patented Oct. 9, 1906.

Application filed July 11, 1905. Serial No. 269,250.

*To all whom it may concern:*

Be it known that I, JOHN SPITTALL, blacksmith, of the city of Winnipeg, in the Province of Manitoba, Canada, have invented a certain new and useful Composition of Matter to be Used for the Welding of Copper and other Metals, of which the following is a specification.

My composition consists of the following ingredients, combined in the proportions stated—viz., boracic acid, two ounces; phosphate of soda, one ounce, these ingredients to be thoroughly mingled by stirring or any other process which will mingle them.

In using the above-named composition the pieces of copper or other metal to be welded should be heated cherry-red. The exact temperature should be estimated by the operator, as is done in the welding of iron or steel. Those parts of the metal which it is proposed to make contiguous in the weld should then be covered lightly with the composition and placed together, the composition not necessarily lying between them, and the welding should be completed by hammering or pressure, as is done in the ordinary welding of iron.

What I claim, and desire to secure by Letters Patent of the United States, is—

The herein-described composition of matter for the welding of copper and other metals, consisting of boracic acid two ounces, and phosphate of soda one ounce, substantially as described and for the purpose specified.

In testimony whereof I have signed my name to this specification in the presence of two subscribing witnesses.

JOHN SPITTALL.

Witnesses:
ANDREW MITCHELL,
J. L. WILLITS.